United States Patent Office 3,780,090
Patented Dec. 18, 1973

3,780,090
N-HALOGENOACYL PHENYL AMINO ACID ESTERS
Keiichiro Akiba, Ikeda, Takeo Satomi, Amagasaki, Akira Fujinami, Ashiya, Yasuhisa Asano, Minoo, Nobuyuki Kameda, Takarazuka, Akihiko Mine and Naganori Hino, Toyonaki, and Kohshi Tateishi, Minoo, Japan, assignors to Sumitomo Chemical Co., Ltd., Osaka-shi, Osaka, Japan
No Drawing. Filed Mar. 15, 1972, Ser. No. 235,044
Claims priority, application Japan, Mar. 15, 1971, 46/14,609
Int. Cl. C07c 103/32
U.S. Cl. 260—471 A                4 Claims

ABSTRACT OF THE DISCLOSURE

N-halogenoacylanilino acids and ester derivatives are disclosed. The compounds exhibit herbicidal properties.

This invention relates to novel N-halogenoacylanilino-fatty acid or the ester derivative thereof as an effective ingredient, to a process for producing the same and to herbicidal composition containing the same.

More particularly, the present invention relates to (1) a novel N-halogeroacylanilino-fatty acid represented by the General Formula I;

<chemical structure: benzene ring with $R_1$ and $R_2$ substituents, N substituted with Y—COOR$_3$ and C(=O)—R$_4$>  (I)

wherein $R_1$ and $R_2$ each represents lower $C_1$–$C_4$ alkyl group, $R_3$ represents hydrogen atom, alkyl, lower $C_3$–$C_5$ alkenyl group or lower $C_3$–$C_4$ alkynyl group, $R_4$ represents lower alkyl group substituted by 1–4 halogen atom, and Y represents lower $C_1$–$C_3$ alkylene group, (2) a process for preparing the compound of the Formula I, which comprises reacting anilino-fatty acid represented by the General Formula II;

<chemical structure: benzene ring with $R_1$, $R_2$, and NH—Y—COOR$_3$>  (II)

wherein $R_1$, $R_2$, $R_3$ and Y are the same as defined above, with halogeno-fatty acid halide represented by the General Formula III;

$R_4COX$   (III)

wherein $R_4$ is the same as defined above and X is a halogen atom, in the presence of a suitable dehydrohalogenating agent to obtain N-halogenoacylanilino-fatty acid or the ester derivative thereof represented by the General Formula I, and (3) a process for preparing the compound of the Formula I which comprises reacting alkali metal salt of halogeno-fatty acid anilide derivative represented by the General Formula IV;

<chemical structure: benzene ring with $R_1$, $R_2$, and NHC(=O)—R$_4$>  (IV)

wherein $R_1$, $R_2$ and $R_4$ are the same as defined above, with halogeno-fatty acid ester represented by the General Formula V;

$Z—Y—COOR_3$   (V)

wherein Y and $R_3$ are the same as defined above, and Z represents halogen atom, or with the ester derivative thereof to obtain N-halogenoacylanilino-fatty acid represented by the General Formula I or the ester derivative thereof and to (4) herbicidal composition containing the compound of the Formula I as an effective ingredient.

N-halogenoacylanilino-fatty acid and the ester derivative thereof obtained by the present invention are novel, and it has been found by present inventors that they possess strong herbicidal activity which could not be expected from other analogous publicly known compounds, and extremely advantageous selectivity.

That is, the compounds of the present invention have a strong weed-killing effect to a wide scope of weeds and, for example, they have an excellent weed-killing effect to both grassy weeds such as barnyard grass (Echinochloa crusgalli), large crabgrass (Digitaria saguinalis), water foxtail (Alopecurus aequalis), annual bluegrass (Poa annua), etc. and broad-leaf weeds such as chick weed (Stellaria media), common purslane (Portulaca oleracea), redroot pigweed (Amaranthus retroflexus), monochoria (Monochoria viaginalis), false pimpernel (Linderna pyxidaria), etc. Furthermore, the compounds of the present invention are characterized in that they have selectivity toward various crops, and thus, they are capable of controlling weeds without causing any phytotoxicity, for example, to radish, cabbage, pea, sugar beet, burdock, tomato, cotton, wheat, corn, etc.

In addition, the use thereof in a paddy field is extremely effective due to the greatly strong weed-killing effect thereof, and the compounds are capable of controlling main weeds growing in a paddy field, such as barnyardgrass, monochoria, false pimpernel, (Rotala indica), nutsedge sp. (Cyperus difformis), etc. without causing any phytotoxicity to transplanted rice and, furthermore, the compounds have excellent effect of controlling even a perennial plant, slender spiderush which is difficult to control.

The compounds of the present invention are useful as a herbicide for various cereals such as rice, corn, etc., vegetables, fruit trees, a lawn, a meadow, forest, non-farming land, etc.

The present invention (1) has been completed on the basis of the above-mentioned novel knowledge, and relates to a novel N-halogenoacetylanilino-fatty acid or the ester derivative thereof represented by the General Formula I and to their herbicidal composition.

The invention (2) and (3) relates to a process for producing the same and, in the invention (2), N-halogenoacylanilino-fatty acid or the ester derivative thereof can be obtained in general by dissolving anilino-fatty acid or the ester derivative thereof represented by the General Formula II and equimolar amount of halogeno-fatty acid halide represented by the General Formula III in an inert solvent such as benzene, toluene, xylene, ethyl ether, isopropyl ether, ligroin, hexane, acetone, methyl isobutyl ketone, chloroform or carbon tetrachloride, preferably, in benzene, adding dropwise equivalent amount of dehydrohalogenating agent such as pyridine, triethylamine, N,N-diethylaniline, N-methyl-morpholine, sodium carbonate or potassium carbonate, preferably, triethylamine, stirring the mixture for a while, then washing the resulting solution with successive, dilute hydrochloric acid, dilute alkali aqueous solution, and water, and, after drying, removing the solvent to obtain the pure end product in good yield.

In the invention (3), N-halogenoacylanilino-fatty acid or the ester derivative thereof can be obtained by dissolving halogeno-fatty acid anilide derivative in an appropriate solvent such as diethyl ether, isopropyl ether, tetrahydrofuran, dioxane, benzene, toluene or xylene, preferably, in tetrahydrofuran, adding equivalent amount of alkali metal such as sodium, potassium, lithium, etc., or alkyl alkali or phenyl alkali derivative to form alkali metal salt of halogeno-fatty acid anilide derivative, adding thereto equimolar amount of halogeno-fatty acid represented by the General Formula V or the ester derivative thereof stirring the mixture, if necessary, under heating and, after the completion of reaction, removing the solvent and inorganic salts to obtain pure end product in good yield.

Examples of each of the starting materials employed in the present invention are illustrated below but of course the present invention is not limited by them.

Anilino fatty acid and the ester derivative thereof 2,6-dimethylanilino-acetic acid;
methyl 2,6-dimethylanilino-acetate;
ethyl 2,6-dimethylanilino-acetate;
n-propyl 2,6-dimethylanilino-acetate;
iso-propyl 2,6-dimethylanilino-acetate;
n-butyl 2,6-dimethylanilino-acetate;
iso-butyl 2,6-dimethylanilino-acetate;
2-methyl-6-ethylanilino-acetic acid;
methyl 2-methyl-6-ethylanilino-acetate;
ethyl 2-methyl-6-ethylanilino-acetate;
n-propyl 2-methyl-6-ethylanilino-acetate;
2,6-diethylanilino-acetic acid;
methyl 2,6-diethylanilino-acetate;
ethyl 2,6-diethylanilino-acetate;
n-propyl 2,6-diethylanilino-acetate;
2,6-di-n-propylanilino-acetic acid;
methyl 2,6-di-n-propylanilino-acetate;
ethyl 2,6-di-n-propylanilino-acetate;
n-propyl 2,6-di-n-propylanilino-acetate;
n-butyl 2,6-di-n-propylanilino-acetate;
methyl $\alpha$-(2,6-diethylanilino)propionate;
ethyl $\alpha$-(2,6-diethylanilino)propionate;
n-propyl $\alpha$-(2,6-diethylanilino)propionate;
methyl $\beta$-(2,6-diethylanilino)propionate;
ethyl $\beta$-(2,6-diethylanilino)propionate;
n-propyl-$\beta$-(2,6-diethylanilino)propionate;
methyl $\alpha$-(2,6-dimethylanilino)propionate;
ethyl $\alpha$-(2,6-dimethylanilino)propionate;
n-propyl $\alpha$-(2,6-dimethylanilino)propionate;
$\alpha$-(2-methyl-6-ethylanilino)propionic acid;
methyl $\alpha$-(2-methyl-6-ethylanilino)propionate;
ethyl $\alpha$-(2-methyl-6-ethylanilino)propionate;
n-propyl $\alpha$-(2-methyl-6-ethylanilino)propionate;
n-amyl 2,6-dimethylanilino-acetate;
n-hexyl 2,6-dimethylanilino-acetate;
cyclohexyl 2,6-dimethylanilino-acetate;
n-decyl 2,6-dimethylanilino-acetate;
iso-amyl 2,6-dimethylanilino-acetate;
allyl 2,6-dimethylanilino-acetate;
crotonyl 2,6-dimethylanilino-acetate;
$\beta$-methylallyl 2,6-dimethylanilino-acetate;
n-amyl-2-methyl-6-ethylanilino-acetate;
cyclohexyl 2-methyl-6-ethylanilino-acetate;
allyl 2-methyl-6-ethylanilino-acetate;
crotonyl 2-methyl-6-ethylanilino-acetate;
n-amyl 2,6-diethylanilino-acetate;
sec-amyl 2,6-diethylanilino-acetate;
crotonyl 2,6-diethylanilino-acetate;
$\beta$-methallyl 2,6-diethylanilino-acetate;
n-decyl 2,6-diethylanilino-acetate;
cyclohexyl 2,6-diethylanilino-acetate;
n-amyl $\alpha$-2,6-dimethylanilino-propionate;
cyclohexyl $\alpha$-2,6-dimethylanilino-propionate;
allyl $\alpha$-2,6-dimethylanilino-propionate;
n-amyl $\alpha$-2,6-diethylanilino-propionate;
n-hexyl $\alpha$-2,6-diethylanilino-propionate;
n-heptyl $\alpha$-2,6-diethylanilino-propionate;
allyl $\alpha$-2,6-diethylanilino-propionate;
crotonyl $\alpha$-2,6-diethylanilino-propionate;
propargyl 2,6-diethylanilino-acetate;

Halogeno-fatty acid halide monochloroacetic acid chloride;
monobromoacetic acid chloride;
monoiodoacetic acid chloride;
monofluoroacetic acid chloride;
monochloroacetic acid bromide;
monobromoacetic acid bromide;
monoiodoacetic acid bromide;
monofluoroacetic acid bromide;
dichloroacetic acid chloride;
dibromoacetic acid chloride;
trichloroacetic acid chloride;
trifluoroacetic acid chloride;
$\alpha,\alpha$-dichloropropionic acid chloride;
$\alpha,\alpha,\beta,\beta$-tetrafluoropropionic acid chloride;

Halogeno-fatty acid anilide 2,6-dimethyl-monochloroacetic acid anilide;
2,6-dimethyl-monobromoacetic acid anilide;
2,6-dimethyl-monoiodoacetic acid anilide;
2,6-dimethyl-monofluoroacetic acid anilide;
2,6-dimethyl-dichloroacetic acid anilide;
2,6-dimethyl-trichloroacetic acid anilide;
2,6-dimethyl-trifluoroacetic acid anilide;
2,6-dimethyl-$\alpha,\alpha$-dichloropropionic acid anilide;
2-methyl-6-ethyl-monochloroacetic acid anilide;
2-methyl-6-ethyl-monobromoacetic acid anilide;
2-methyl-6-ethyl-monoiodoacetic acid anilide;
2-methyl-6-ethyl-monofluoroacetic acid anilide;
2-methyl-6-ethyl-trichloroacetic acid anilide;
2-methyl-6-ethyl-$\alpha,\alpha,\beta,\beta$-tetrafluoropropionic acid anilide;
2,6-diethyl-monochloroacetic acid anilide;
2,6-diethyl-monobromoacetic acid anilide;
2,6-diethyl-monoiodoacetic acid anilide;
2,6-diethyl-monofluoroacetic acid anilide;
2,6-diethyl-trichloroacetic acid anilide;
2,6-diethyl-trifluoroacetic acid anilide;
2,6-diethyl-$\alpha,\alpha$-dichloropropionic acid anilide;
2,6-diethyl-$\alpha,\alpha,\beta,\beta$-tetrafluoropropionic acid anilide;
2,6-di-n-propyl-monochloroacetic acid anilide;
2,6-di-n-propyl-monobromoacetic acid anilide;
2,6-di-n-propyl-monoiodoacetic acid anilide;
2,6-di-n-propyl-monofluoroacetic acid anilide;
2,6-di-n-propyl-trichloroacetic acid anilide;
2,6-di-n-propyl-$\alpha,\alpha$-dichloropropionic acid anilide;
2,6-di-n-propyl-dichloroacetic acid anilide;
2,6-di-n-propyl-trifluoroacetic acid anilide;

Halogeno-fatty acid and the ester derivative thereof monochloroacetic acid;
methyl monochloroacetate;
ethyl monochloroacetate;
n-propyl monochloroacetate;
iso-propyl monochloroacetate;
n-butyl monochloroacetate;
iso-butyl monochloroacetate;
monobromoacetic acid;
methyl monobromoacetate;
ethyl monobromoacetate;
n-propyl monobromoacetate;
n-butyl monobromoacetate;
propargyl monobromoacetate;
monoiodoacetic acid;
methyl monoiodoacetate;
ethyl monoiodoacetate;
n-propyl monoiodoacetate;
n-butyl monoiodoacetate;
dichloroacetic acid;
methyl dichloroacetate;
ethyl dichloroacetate;
n-propyl dichloroacetate;
trichlorocacetic acid;
methyl trichloroacetate;
ethyl trichloroacetate;
n-butyl trichloroacetate;
$\alpha,\alpha$-dichloropropionic acid;
methyl $\alpha,\alpha$-dichloropropionate;
ethyl $\alpha,\alpha$-dichloropropionate;

α,α-β,β-tetrafluoropropionic acid;
methyl α,α-β,β-tetrafluoropropionate;
ethyl α,α-β,β-tetrafluoropropionate;
n-propyl α,α-β,β-tetrafluoropropionate.

In a practical application, the compounds of the present invention may be spread as such, or may be used in any form of granule, wettable powder, emulsion, and dust.

As the solid carriers used in preparing these preparations, there are illustrated, for example, talc, bentonite, clay, kaolin, diatomaceous earth, vermiculite, slaked lime, etc. and, as the liquid carriers, there are illustrated benzene, toluene, xylene, alcohols, acetone, methylnaphthalene, diozane, cyclohexanone, etc. As the emulsifying agents, there are illustrated alkylsulfuric esters, alkylsulfonate, arylsulfonate, polyethylene glycol ethers, polyhydric alcohol esters, etc.

In a practical application, a speader such as a surface active agent used in agricultural field may of course be mixed so as to improve and ensure the herbicidal effect, and, it is also possible to use in combination with other agricultural chemicals such as fungicides, insecticides, herbicides, etc., or with fertilizers.

The combination examples of the composition of the present invention are shown below.

EXAMPLE 1

25 parts by weight of N-chloroacetyl - 2,6 - diethylanilino-acetic acid, 5 parts by weight of polyoxyethylene acetylaryl ester surface active agent and 70 parts by weight of talc are well crushed and mixed to obtain a wettable powder.

EXAMPLE 2

25 parts by weight of N-chloroacetyl - 2,6 - dimethylanilino-acetic acid n-amyl ester, 5 parts by weight of polyoxyethylene acetylaryl ester surface active agent and 70 parts by weight of talc are well crushed and mixed to obtain a wettable powder.

EXAMPLE 3

30 parts by weight of ethyl N-chloroacetyl - 2,6 - diethylanilino-acetate, 20 parts by weight of polyethylene glycol ether surface active agent and 50 parts by weight of cyclohexanone are well mixed to obtain an emulsion.

EXAMPLE 4

30 parts by weight of n-decyl N-chloroacetyl-2,6-diethylanilino-acetate, 20 parts by weight of polyethylene glycol ether surface active agent and 50 parts by weight of cyclohexanone are well mixed to obtain an emulsion.

EXAMPLE 5

8 parts by weight of ethyl N-chloroacetyl-2,6-diethylanilinoacetate, 38 parts by weight of bentonite, 50 parts by weight of clay and 4 parts by weight of sodium lignin sulfonate are well crushed and mixed, and, after well kneading with the addition of water, granulated and dried to obtain a granule.

EXAMPLE 6

8 parts by weight of allyl N-dichloroacetyl - 2,6 - diethylanilinoacetate, 38 parts by weight of bentonite, 50 parts by weight of clay and 4 parts by weight of sodium lignin sulfonate are well crushed and mixed, and, after kneading with the addition of water, granulated and dried to obtain a granule.

The present invention will be explained in greater detail by the following examples, but not limited only to them as a matter of course.

TABLE 1 — N-halogenoacylanilino-fatty acid or the ester derivative thereof

| Example number | Anilino-fatty acid or the ester thereof | Halogeno-acetic acid halide | Chemical structure | Physical constant | Yield, percent | Calcd. C | Calcd. H | Calcd. N | Calcd. Cl | Found C | Found H | Found N | Found Cl |
|---|---|---|---|---|---|---|---|---|---|---|---|---|---|
| 8 | Ethyl 2,6-dimethylanilinoacetate | ClCH₂COCl | (structure) | $n_D^{23}$ 1.3647; B.P.$_{0.4}$ 136–138° C | 85 | 59.26 | 6.39 | 4.94 | 12.50 | 59.37 | 6.28 | 5.02 | 12.51 |
| 9 | Ethyl 2-methyl-6-ethylanilinoacetate | ClCH₂COCl | (structure) | $n_D^{22}$ 1.5271; B.P.$_{0.7}$ 161–163° C | 88 | 60.50 | 6.77 | 4.70 | 16.12 | 60.47 | 6.85 | 4.66 | 16.23 |
| 10 | Ethyl 2,6-dimethylanilinoacetate | Cl₃CCOCl | (structure) | $n_D^{21.5}$ 1.4230; B.P.$_{0.4}$ 162–163° C | 75 | 47.68 | 4.57 | 3.97 | 30.16 | 47.54 | 4.64 | 3.87 | 30.20 |

EXAMPLE 7

23.5 grams (0.1 mol) of ethyl 2,6-diethylanilinoacetate and 11.3 g. (0.1 mol) of monochloroacetic acid chloride were dissolved in 100 ml. of benzene, 11.0 g. of triethylamine was then added dropwise thereto with stirring maintaining the reaction temperature at 10–20° C. and, thereafter, stirring was continued for further 2 hours at a room temperature. The reaction solution was washed with successive, 5% sodium hydroxide aqueous solution, 5% hydrochloric acid aqueous solution, and water. Then, the benzene layer was dried over anhydrous sodium sulfate. Thereafter, benzene was removed under reduced pressure to obtain the end product, ethyl N-chloroacetyl-2,6-diethylanilinoacetate. $n_D^{26}$: 1.5225.

*Elementary analysis.*—Calculated for $C_{16}H_{22}NClO_3$ (percent): C, 61.63; H, 7.11; N, 4.49; Cl, 11.37. Found (percent): C, 61.81; H, 7.08; N, 4.42; Cl 11.48.

The results obtained in the similar manner as above shown in Table 1, above.

EXAMPLE 11

22.6 grams (0.1 mol) of 2,6-diethyl-chloroacetoanilide was dissolved in 100 ml of tetrahydrofuran, and 45 g. of n-hexane solution containing 15% of n-butyl lithium was gradually added dropwise thereto at a room temperature with stirring. Furthermore, 12.3 g. (0.1 mol) of ethyl monochloroacetate was added thereto, and the mixture was refluxed for 4 hours. After cooling, 20 g. of ethanol was added to the reaction mixture, and the solvent was removed under reduced pressure. The resulting residue was extracted with 100 ml. of diethyl ether. After washing with water, the ether layer was dried over anhydrous sodium sulfate, and the solvent was removed to obtain 24.9 g. of the end product, ethyl N-chloroacetyl-2,6-diethylanilinoacetate. $n_D^{24}$: 1.5228.

*Elementary analysis.*—Calcd. for $C_{16}H_{22}NClO_3$ (percent): C, 61.63; H, 7.11: N, 4.49; Cl, 11.37. Found (percent): C, 61.77; H, 7.20; N, 4.46; Cl, 11.22.

The results obtained in the similar manner as above are shown in the following Table 2.

EXAMPLE 14

24.7 grams of allyl 2,6-diethylanilinoacetate and 11.3 g. of monochloroacetic acid chloride were dissolved in 100 ml. of benzene, 11.0 g. of triethylamine was then added dropwise thereto with stirring maintaining the reaction temperature at 10–20° C., and, thereafter, stirring was continued for further 2 hours at a room temperature. The reaction solution was washed with successive, 5% sodium hydroxide aqueous solution, 5% hydrochloric acid aqueous solution, and water. Then, the benzene layer was dried over anhydrous sodium sulfate. Thereafter, benzene was removed under reduced pressure to obtain the end product, allyl N-chloroacetyl-2,6-diethylanilinoacetate. $n_D^{21.5}$: 1.5288.

*Elementary analysis.*—Calcd. for $C_{17}H_{22}NClO_3$ (percent): C, 63.05; H, 6.85; N, 4.33; Cl, 10.95. Found (percent): C, 63.09; H, 6.85; N, 4.19; Cl, 10.88.

The results obtained in the similar manner as above are shown in the following Table 3.

TABLE 2.—N-halogenoacylanilino-fatty acid or the ester derivative thereof obtained

| Ex. No. | Monohalogeno-acetic acid amide | Halogeno-fatty acid or the ester thereof | Chemical structure | Yield percent | Physical constant | Calcd. C | Calcd. H | Calcd. N | Calcd. Cl | Found C | Found H | Found N | Found Cl |
|---|---|---|---|---|---|---|---|---|---|---|---|---|---|
| 11 | N-(2,6-dimethylphenyl)monochloroacetamide | Ethylmonochloroacetate | CH₃–C₆H₃(CH₃)–N(CH₂COOC₂H₅)(CCH₂Cl=O) | 78 | $n_D^{23}$ 1.3645; B.P. 0.35, 134–137° C | 59.26 | 6.39 | 4.94 | 12.50 | 59.41 | 6.49 | 4.81 | 12.57 |
| 12 | N-(2-methyl-6-ethylphenyl)monochloroacetamide | Ethyl monobromoacetate | CH₃–C₆H₃(C₂H₅)–N(CH₂COOC₂H₅)(CCH₂Cl=O) | 69 | $n_D^{22}$ 1.5274; B.P. 0.47, 160–164° C | 60.50 | 6.77 | 4.70 | 16.12 | 60.54 | 6.69 | 4.83 | 16.14 |
| 13 | N-(2,6-diethylphenyl)monochloroacetamide | Butyl monochloroacetate | C₂H₅–C₆H₃(C₂H₅)–N(CH₂COOC₄H₉)(CCH₂Cl=O) | 86 | $n_D^{23.5}$, 1.5176 | 63.61 | 7.71 | 4.12 | 10.43 | 63.59 | 7.82 | 4.29 | 10.37 |

TABLE 3

| Ex. No. | Anilino-fatty acid ester used | Halogeno-fatty acid halide used | N-halogenoacylanilino-fatty acid ester obtained ||||||||||
|---|---|---|---|---|---|---|---|---|---|---|---|
| | | | Chemical structure | Physical constant | Yield, percent | Calcd. ||| Found |||
| | | | | | | C | H | N | Cl | C | H | N | Cl |
| 15 | 2,6-di-CH₃-C₆H₃-NHCH₂COOC₅H₁₁(n) | ClCH₂COCl | 2,6-di-CH₃-C₆H₃-N(CH₂COOC₅H₁₁(n))(COCH₂Cl) | $n_D^{24}$, 1.5268 | 86 | 62.67 | 7.42 | 4.30 | 10.88 | 62.54 | 7.58 | 4.20 | 10.81 |
| 16 | 2,6-di-C₂H₅-C₆H₃-NHCH₂COOC₁₀H₂₁(n) | ClCH₂COBr | 2,6-di-C₂H₅-C₆H₃-N(CH₂COOC₁₀H₂₁(n))(COCH₂Cl) | $n_D^{23}$, 1.5297 | 71 | 67.98 | 9.03 | 3.30 | 8.36 | 68.05 | 8.99 | 3.34 | 8.16 |
| 17 | 2,6-di-C₂H₅-C₆H₃-NHCH₂COOCH₂CH=CH₂ | Cl₂CHCOCl | 2,6-di-C₂H₅-C₆H₃-N(CH₂COOCH₂CH=CH₂)(COCHCl₂) | $n_D^{23}$, 1.5376 | 82 | 56.99 | 5.91 | 3.91 | 19.79 | 57.18 | 5.77 | 3.90 | 19.75 |
| 18 | 2-CH₃-6-C₃H₇(n)-C₆H₃-NHCH₂COOC(CH₃)(C₄H₉)C₂=CH₂ | BrCH₂COCl | 2-CH₃-6-C₃H₇(n)-C₆H₃-N(CH₂COOC(CH₃)C₂=CH₂)(COCH₂Br) | $n_D^{22}$, 1.5325 | 77 | 56.55 | 6.33 | 3.66 | 20.90¹ | 56.72 | 6.30 | 3.87 | 22.11 |
| 19 | 2,6-di-C₂H₅-C₆H₃-NHCH₂COO-C₆H₁₁ | Cl₃COCl | 2,6-di-C₂H₅-C₆H₃-N(CH₂COO-C₆H₁₁)(COCCl₃) | $n_D^{23}$, 1.5441 | 65 | 55.25 | 6.03 | 3.22 | 24.46 | 55.34 | 6.16 | 3.24 | 24.53 |
| 20 | 2,6-di-C₂H₅-C₆H₃-NHCH₂COOCH₂C≡CH | ClCH₂COCl | 2,6-di-C₂H₅-C₆H₃-N(CH₂COOCH₂C≡CH)(COCH₂Cl) | $n_D^{22.5}$, 1.5408 | 84 | 63.45 | 6.26 | 4.35 | 11.02 | 63.52 | 6.48 | 4.17 | 10.64 |

¹ Bromine.

Test Example 1

Barnyard grass and large crabgrass as the representatives of grassy weeds, and radish and red root pigweed as the representative of broad-leaf plants each was sown in an unglazed flower pot of 12 cm. in diameter, and, after covering with the soil, treated with the chemicals. Thereafter, these plants were reared in a greenhouse, and the herbicidal effect was observed 20 days after the treatment. The results are shown in Table 4. The estimation of the herbicidal effect is expressed by numerals of from 0 (no injuries) to 5 (completely dead). All the compounds were used in the form of wettable powder diluted with water.

TABLE 4

| Compound | Applied amount (g./10 a.) | Herbicidal effect | | | |
|---|---|---|---|---|---|
| | | Barnyard grass | Large crab grass | Red root pig weed | Radish |
| N-chloroacetyl-2,6-diethyl-anilinoacetic acid ethyl ester | 125 | 5 | 5 | 5 | 0 |
| | 63 | 5 | 5 | 4 | 0 |
| | 32 | 5 | 5 | 2 | 0 |
| | 16 | 5 | 4 | 1 | 0 |
| Ethyl N-chloroacetyl-2-methyl-6-n-propyl-anilino-acetate | 125 | 5 | 5 | 5 | 0 |
| | 63 | 5 | 5 | 3 | 0 |
| | 32 | 5 | 5 | 1 | 0 |
| 2-chloro-2',6'-diethylaceto-anilide [1] | 125 | 5 | 4 | 2 | 0 |
| | 63 | 4 | 4 | 0 | 0 |
| | 32 | 1 | 1 | 0 | 0 |
| n-Amyl N-chloroacetyl-2,6-dimethylanilinoacetate | 125 | 5 | 5 | 5 | 0 |
| | 63 | 5 | 5 | 3 | 0 |
| | 32 | 4 | 5 | 1 | 0 |
| Allyl N-dichloroacetyl-2,6-diethylanilinoacetate | 125 | 5 | 5 | 5 | 0 |
| | 63 | 5 | 5 | 4 | 0 |
| | 32 | 5 | 5 | 2 | 0 |
| 2-chloro-2',6'-diethylaceto anilide [1] | 125 | 5 | 4 | 2 | 0 |
| | 63 | 4 | 4 | 0 | 0 |
| | 32 | 1 | 1 | 0 | 0 |

[1] Control compound.

Test Example 2

1.5 kg. of paddy field soil was placed in each of Wagner pot of 14 cm. in diameter, and the pots were brought into a paddy field state. Thereafter, third-leaf period rice seedlings were transplanted to the pot, which was further sown with the seeds of barnyard grass, and the water-flooded soil was treated with prescribed amount of the chemicals. On the 25th day after the treatment with the chemicals, the herbicidal effect and the degree of phytotoxicity were investigated about the transplanted or sown plants described above, and the spontaneously generated broad-leaf weeds such as monochoria, false pimpernel, *Rotala indica* Koehne, etc. and slender spikerush. The chemicals were applied in the form of an emulsion prepared according to the same prescription as in the Example 2 described above. The results are shown in Table 5. The estimations of herbicidal effect and phytotoxicity were expressed by numerals 0–5 as follows.

Action on plants:
```
0 _____ Nothing.
1 _____ Slight.
2 _____ Small.
3 _____ Middle.
4 _____ Large.
5 _____ Completely dead.
```

TABLE 5.—WATER-FLOODED SOIL TREATMENT TEST

| Compound | Applied amount (g./10 a.) | Phytotoxicity to rice | Herbicidal effect | | |
|---|---|---|---|---|---|
| | | | Barnyard grass | Broadleaf weeds | Slender spikerush |
| Ethyl N-chloroacetyl-2,6-diethylanilinoacetate. | 63 | 0 | 5 | 5 | 3 |
| | 32 | 0 | 5 | 5 | 2 |
| | 16 | 0 | 5 | 4 | 0 |
| | 8 | 0 | 5 | 2 | 0 |
| Ethyl N-chloroacetyl-2-methyl-6-n-propylanilinoacetate. | 63 | 0 | 5 | 5 | 3 |
| | 32 | 0 | 5 | 5 | 2 |
| | 16 | 0 | 5 | 3 | 0 |
| Butyl N-chloroacetyl-2,6-diethylanilinoacetate. | 63 | 0 | 5 | 5 | 4 |
| | 32 | 0 | 5 | 5 | 3 |
| | 16 | 0 | 5 | 4 | 0 |
| 2-chloro-2,6-diethyl-acetanilide.[1] | 63 | 0 | 5 | 3 | 0 |
| | 32 | 0 | 4 | 0 | 0 |
| | 16 | 0 | 2 | 0 | 0 |
| n-Amyl N-chloroacetyl-2,6-dimethylanilinoacetate. | 63 | 0 | 5 | 5 | 3 |
| | 32 | 0 | 5 | 5 | 2 |
| | 16 | 0 | 5 | 3 | 0 |
| Allyl N-dichloroacetyl-2,6-diethylanilinoacetate. | 63 | 0 | 5 | 5 | 3 |
| | 32 | 0 | 5 | 5 | 3 |
| | 16 | 0 | 5 | 4 | 1 |
| 2-chloro-2',6'-diethylacetanilide.[1] | 63 | 0 | 5 | 3 | 0 |
| | 32 | 0 | 4 | 0 | 0 |
| | 16 | 0 | 2 | 0 | 0 |

[1] Control compound.

What is claimed is:

1. A compound of the formula,

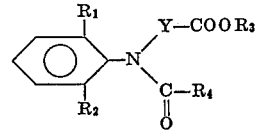

wherein $R_1$ and $R_2$ each represents lower alkyl group, $R_3$ represents a hydrogen atom, lower alkyl, lower alkenyl or lower alkynyl group, $R_4$ represents lower alkyl group substituted by 1–4 halogen atoms, and Y represents lower alkylene group.

2. A compound of the formula,

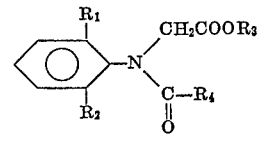

wherein $R_1$, $R_2$, $R_3$ and $R_4$ are the same as defined above.

3. A compound of the formula,

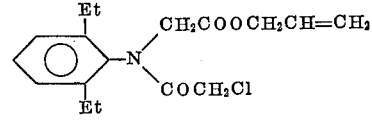

4. The compound:

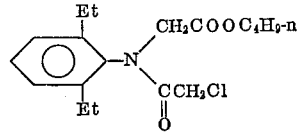

References Cited

UNITED STATES PATENTS 3,660,475  5/1972  Neighbors _____ 260—471 A

LORRAINE A. WEINBERGER, Primary Examiner

L. A. THAXTON, Assistant Examiner

U.S. Cl. X.R.

71—111, 115; 260—518 A